United States Patent
Remington, Jr. et al.

(10) Patent No.: US 9,328,015 B2
(45) Date of Patent: May 3, 2016

(54) CURING COATINGS ON GLASS CONTAINERS

(75) Inventors: Michael P. Remington, Jr., Toledo, OH (US); Terence K. G. Howse, Toledo, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 1319 days.

(21) Appl. No.: 12/727,511

(22) Filed: Mar. 19, 2010

(65) Prior Publication Data

US 2011/0226786 A1    Sep. 22, 2011

(51) Int. Cl.
*B05D 3/06* (2006.01)
*B65D 1/40* (2006.01)
*C03C 17/00* (2006.01)
*C03C 23/00* (2006.01)

(52) U.S. Cl.
CPC .............. *C03C 17/005* (2013.01); *C03C 17/007* (2013.01); *C03C 23/0005* (2013.01); *C03C 2217/445* (2013.01); *C03C 2217/475* (2013.01); *C03C 2217/476* (2013.01); *C03C 2217/479* (2013.01); *C03C 2217/48* (2013.01)

(58) Field of Classification Search
CPC   C03C 17/005; C03C 17/007; C03C 23/0005; C03C 2217/445; C03C 2217/46; C03C 2217/475; C03C 2217/476; C03C 2217/479; C03C 2217/48
See application file for complete search history.

(56) References Cited

U.S. PATENT DOCUMENTS

| 2,210,187 | A | | 9/1938 | Ross |
| 2,393,541 | A | | 1/1946 | Kohler |
| 4,009,301 | A | | 2/1977 | Heckman et al. |
| 4,115,599 | A | | 9/1978 | Taylor |
| 4,163,031 | A | * | 7/1979 | Hannon et al. ............... 524/114 |
| 4,968,726 | A | * | 11/1990 | Thorsrud ...................... 523/137 |
| 5,182,134 | A | | 1/1993 | Sato |
| 5,328,539 | A | | 7/1994 | Sato |
| 5,518,546 | A | * | 5/1996 | Williams et al. ............... 118/621 |
| 5,549,999 | A | * | 8/1996 | Swain et al. ................... 430/127 |
| 5,837,088 | A | | 11/1998 | Palmgren et al. |
| 6,348,679 | B1 | | 2/2002 | Ryan et al. |
| 6,600,142 | B2 | | 7/2003 | Ryan et al. |
| 7,323,121 | B2 | | 1/2008 | Burgard et al. |
| 2004/0159654 | A1 | | 8/2004 | Ryan et al. |
| 2004/0180213 | A1 | | 9/2004 | Harris et al. |
| 2005/0274455 | A1 | * | 12/2005 | Extrand ...................... 156/272.4 |
| 2008/0138533 | A1 | | 6/2008 | Borneman et al. |
| 2008/0199701 | A1 | | 8/2008 | Kuehnle et al. |
| 2009/0100872 | A1 | | 4/2009 | Hawtof et al. |
| 2010/0215555 | A1 | | 8/2010 | Jin et al. |

FOREIGN PATENT DOCUMENTS

| EP | 2194027 A1 | 6/2010 |
| WO | WO 2006/099906 A1 | 9/2006 |
| WO | WO 2011/016998 A2 | 2/2011 |

* cited by examiner

*Primary Examiner* — Elena T Lightfoot

(57) ABSTRACT

A method of applying a coating to a glass container, which includes the steps of coating an exterior surface of the glass container with a thermally-curable coating material containing electrically-conductive nanoparticles, and exposing the coated container to radio frequency radiation such that absorption of the radio frequency radiation by the nanoparticles internally heats and cures the thermally-curable coating material on the exterior surface of the glass container to result in a cured coating on the glass container.

28 Claims, 2 Drawing Sheets

| Nanoparticle Properties | Thermally-Curable Coating Material Properties | | | | | | |
|---|---|---|---|---|---|---|---|
| | Strength | Strength/Color | Strength/Color/UV | Color | Color/UV | UV |
| Strength | x | x | | | x | x | x |
| Strength/Color | x | x | x | x | x | x |
| Strength/UV | x | x | x | x | x | x |
| Strength/Antimicrobial | x | x | x | x | x | x |
| Color | x | x | x | x | x | x |
| Color/UV | x | x | x | x | x | x |
| Color/Antimicrobial | x | x | x | x | x | x |
| UV | x | x | x | x | x | x |
| UV/Antimicrobial | x | x | x | x | x | x |
| Antimicrobial | x | x | x | x | x | x |

FIG. 3

CURING COATINGS ON GLASS CONTAINERS

The present disclosure is directed to coated glass containers, to coating processes including methods and materials for coating glass containers, and to curing glass container coatings.

BACKGROUND AND SUMMARY OF THE DISCLOSURE

Various processes have been developed to apply coatings to glass containers for different purposes including decoration, adhesion, and glass strengthening for damage prevention. For example, U.S. Pat. No. 4,009,301 discloses a method and apparatus for powder coating glass containers. Uncoated glass containers are pre-heated in an oven to about 150-425 F, sprayed with a powder coating in a spray tunnel, and then heated in a convection oven to about 400-425 F to cure the coating on the glass containers. Such conventional curing of thermal coatings requires tens of minutes to complete and, thus, cannot be carried out in an on-line manner at current container manufacturing line speeds.

A general object of the present disclosure, in accordance with one aspect of the disclosure, is to eliminate the need for using separate curing ovens in an off-line or downstream operation, and to provide a coating curing technique that is more rapid than convection oven thermal curing but has durability benefits normally associated with oven cured coatings, and to provide curing materials that enhance coating properties.

The present disclosure embodies a number of aspects that can be implemented separately from or in combination with each other.

A method of applying a coating to a glass container in accordance with one aspect of the disclosure includes the steps of coating an exterior surface of the glass container with a thermally-curable coating material containing electrically-conductive nanoparticles, and exposing the coated container to radio frequency radiation such that absorption of the radio frequency radiation by the nanoparticles internally heats and cures the thermally-curable coating material on the exterior surface of the glass container to result in a cured coating on the glass container.

In accordance with another aspect of the disclosure, there is provided a method of applying a coating to a glass container. The method includes coating an exterior surface of the glass container with a thermally-curable coating material composed of at least one of the members selected from the group consisting of: silane, siloxane, silicone, urethane, acrylate, and epoxy, and with electrically-conductive nanoparticles of 1 to 100 nanometers along their largest dimension and composed of at least one of the members selected from the group consisting of: copper, gold, silver, platinum, aluminum, zinc oxide (undoped, and/or doped with fluorine, aluminum, gallium, and/or indium), zinc stannate ($ZnSnO_3$ or $Zn_2SnO_4$), tin dioxide (undoped, and/or doped with fluorine, antimony, phosphorus, and/or boron), and indium tin oxide. The method also includes exposing the coated container to radio frequency radiation of less than one gigahertz such that absorption of the radio frequency radiation by the nanoparticles internally heats and cures the thermally-curable coating material on the exterior surface of the glass container to result in a cured coating on the glass container.

In accordance with a further aspect of the disclosure, there is provided a method of applying a coating to a glass container. The method includes coating an exterior surface of the glass container with a thermally-curable coating material to impart one or more desirable properties to the glass container including at least one of strength, color, or ultraviolet protection properties. The method also includes coating the exterior surface of the glass container with electrically-conductive nanoparticles for use as susceptors to absorb radio frequency radiation and internally transfer heat to the thermally-curable coating material, and also for use in at least one of supplementing the thermally-curable coating material in imparting the one or more desirable properties to the glass container or complementing the thermally-curable coating material to impart one or more additional desirable properties to the glass container including at least one of strength, color, ultraviolet protection, or antimicrobial properties. The method further includes exposing the coated container to radio frequency radiation such that absorption of the radio frequency radiation by the nanoparticles internally heats and cures the thermally-curable coating material on the exterior surface of the glass container to result in a cured coating on the glass container.

In accordance with an additional aspect of the disclosure, there is provided a product including a glass container including an exterior surface, and a coating cured on the exterior surface of the glass container. The cured coating includes electrically-conductive nanoparticles radiated by radio frequency radiation, and a thermally-curable coating material cured by heat generated by the radiated electrically-conductive nanoparticles.

BRIEF DESCRIPTION OF THE DRAWINGS

The disclosure, together with additional objects, features, advantages and aspects thereof, will be best understood from the following description, the appended claims and the accompanying drawings, in which:

FIG. 3 is a table of various combinations of thermally-curable coating material properties and nanoparticle properties for a glass container in accordance with exemplary embodiments of the present disclosure.

DETAILED DESCRIPTION OF PREFERRED EMBODIMENTS

Figure 1:
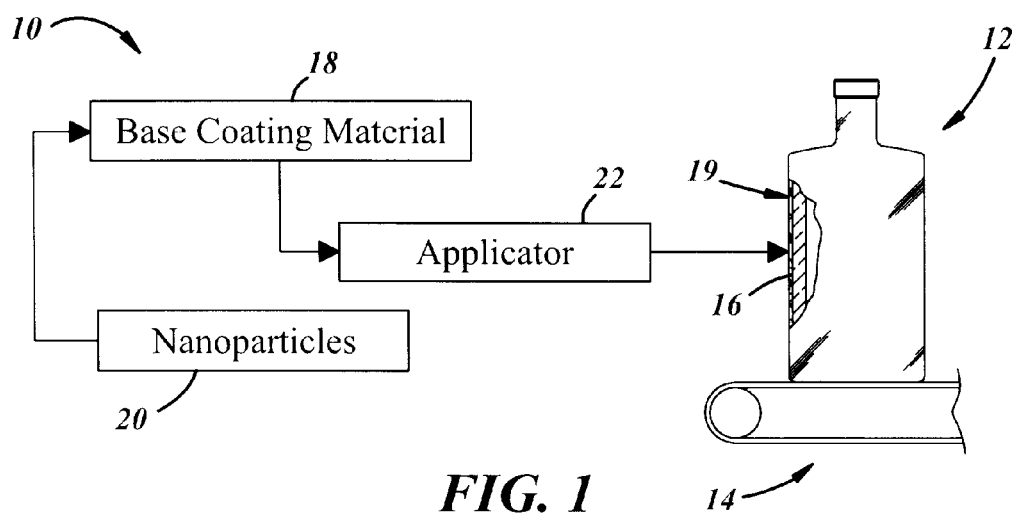
FIG. 1 is a schematic view of a coating application process for a glass container in accordance with an exemplary embodiment of the present disclosure.

FIG. 1 illustrates an exemplary embodiment of a glass container coating application process 10. The process 10 may include receiving a glass container 12, for example, via a material handling apparatus 14. The glass container 12 includes a bottle as shown, a jar, or any other suitable type of container, and includes an exterior surface 16. The material handling apparatus 14 includes any suitable device(s) to immobilize, rotate, invert, raise, lower, or otherwise move the glass container 12.

Also, the process 10 includes receiving a coating material 18 and electrically conductive nanoparticles 20. The thermally-curable coating material 18 is used to impart one or more desirable characteristics or properties to the glass container 12 at existing container manufacturing line speeds, which typically range about 25 to 600 containers per minute. For instance, the thermally-curable coating material 18 may impart one or more of the following properties to the container 12: strength, color, and/or ultraviolet (UV) protection. The electrically conductive nanoparticles 20 are used primarily as curing materials to cure the thermally-curable coating material 18. Preferably, the nanoparticles 20 are used as susceptors to absorb electromagnetic energy and convert it to thermal energy, which is used for heat transfer from the nanoparticles 20 to molecules in the thermally-curable coating material 18 to heat, and thereby cure, the thermally-curable coating material 18 on the glass container 12. The nanoparticles 20 also may have one or more secondary purposes as will be described below.

Further, the process 10 includes applying the thermally-curable coating material 18 and the nanoparticles 20 to the glass container 12, for example, using an applicator 22 of any suitable type. For example, the applicator 22 may include a sprayer, bath, or any other suitable device(s), that may be used to apply the thermally-curable coating material 18 and nanoparticles 20 to the glass container 12. In one embodiment, the applicator 22 may blend or mix the thermally-curable coating material 18 and the nanoparticles 20 together, and apply them in combination as a blended, applied coating 19. In another embodiment, the thermally-curable coating material 18 and the nanoparticles 20 may be applied separately to the container 12 by one or more applicators. Also, it is possible, but not necessary, to modify or functionalize nanoparticle surfaces with any suitable organic moieties to improve solubility or dispersability of the nanoparticles.

Figure 2:
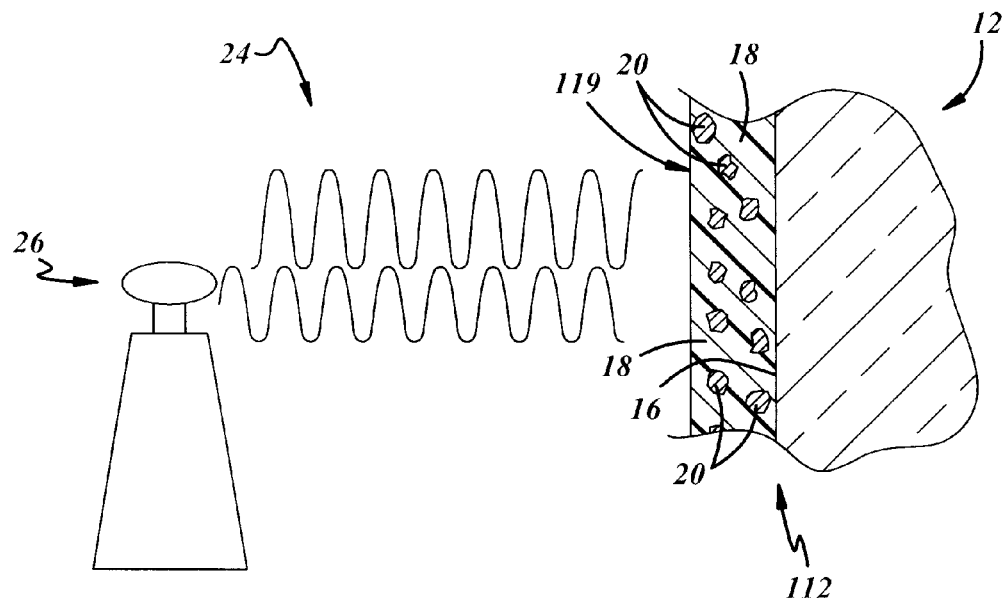
FIG. 2 is a schematic view of a coating curing process downstream of the process of FIG. 1 and in accordance with another exemplary embodiment of the present disclosure.

As illustrated in FIG. 2, the process 10 includes applying electromagnetic (EM) radiation 24 to the nanoparticles 20 applied to the glass container 12, for example, using an EM emitter 26 of any suitable type. In general, EM radiation includes two orthogonal components—magnetic and electrical, and for a material of interest to absorb EM radiation, the material couples with either of the electrical or magnetic components. For example, magnetic particles are typically from 10 to 1,000 microns in diameter and include ferromagnetic oxides, and metals like iron, cobalt, and nickel. But such particles may be disadvantageous in that they are greater in size than the wavelength of visible light and, thus, would not result in a desired level of transparency when applied to the glass container 12. In another example, electrically polar particles include ionic or polar compounds such as lithium salts like lithium perchlorate and lithium acetate, or other inorganic salts such as tin or zinc chlorides and their hydrates and ionomers. It is believed that dispersion of such particles in the presently disclosed coating materials would be particularly difficult and would have a negative influence on transparency of a resulting coating and glass article.

The applied EM radiation 24 is radio frequency (RF) radiation excluding microwave radiation. In particular, the radiation 24 may be low frequency radiation ranging from 30 to 300 kilohertz (KHz), medium frequency radiation ranging from 300 KHz to 3 megahertz (MHz), and/or high frequency radiation ranging from 3 to 30 MHz. Nonetheless, the radiation 24 may include ultrahigh and very high frequency RF bands less than microwave radiation. As used herein, the terminology microwave radiation generally includes electromagnetic waves having a wavelength between about 0.3 and 30 centimeters, and corresponding to frequencies of one gigahertz (GHz) to 100 GHz. Also, the radiation 24 may include very low to extremely low frequency RF bands.

In any event, the radiation 24 provides intense, localized heating of the nanoparticles 20. Preferably, the nanoparticles 20 absorb, or couple with the electrical components of, the radio frequency radiation, and then heat and cure the thermally-curable coating material 18 on the exterior surface of the glass container 12. In other words, via thermal conduction or heat transfer, the heated nanoparticles 20 provide heat to areas adjacent the nanoparticles 20 including molecules of the thermally-curable coating material 18. Also, the nanoparticle-heated molecules of the thermally-curable coating material 18 may provide heat to other molecules of the thermally-curable coating material 18. Accordingly, the applied coating becomes cured and results in a cured coating 119 on the glass container 12, thereby resulting in a cured coated container 112.

The thermally-curable coating material 18 may be a liquid or a powder form, and preferably is an organic material. For example, the thermally-curable coating material 18 may include one or more of a silane, siloxane, silicone, urethane, acrylate, or an epoxy material, or any other suitable polymeric material, and it is believe that such may be provided with or without binders, fillers, or the like. In any case, the thermally-curable coating material 18 may be a relatively transparent material. For example, the thermally-curable coating material 18 preferably does not reduce the transparency (or increase the opacity) of the container 12 by greater than about 15%.

The nanoparticles 20 may be, for example, about 1 to 500 nanometers along their largest dimension. A preferable range is about 1 to 250 nanometers, and a more preferable range is about 1 to 100 nanometers. The nanometer size allows the cured coating material 18 to substantially remain transparent. For example, the particle containing coating preferably does not reduce the transparency (or increase the opacity) of the container by greater than about 15%. An example range of nanoparticle percentage relative to the overall applied coating by weight is about 0.5 to ten percent. A preferable range is about 0.5 to five percent by weight, and a more preferable range is about 0.5 to one percent by weight.

The nanoparticles 20 may be in any suitable form. For example, the nanoparticles 20 may be in the form of nanotubes, nanospheres, nanorods, nanofibers, nanocups, or in any other suitable form.

The nanoparticles 20 may be composed of any suitable non-magnetic electrically conductive material(s). Preferably, the nanoparticles 20 may be composed of any suitable non-ferrous electrically conductive material(s). For example, the nanoparticles 20 may include transition and/or post-transition elements, including but not limited to copper, gold, silver, platinum, and/or aluminum. In other examples, the nanoparticles 20 may include one or more electrical conducting oxides. The electrical conducting oxides may be non-magnetic or non-ferrous metal oxides, and particular examples may include one or more of zinc oxide (undoped, and/or doped with fluorine, aluminum, gallium, and/or indium), zinc stannate ($ZnSnO_3$, $Zn_2SnO_4$), tin dioxide (undoped, and/or doped with fluorine, antimony, phosphorus, and/or boron), or indium tin oxide (ITO).

In addition to serving as susceptors to absorb radio frequency radiation and internally transfer heat to and cure the thermally-curable coating material 18, the nanoparticles 20 also may be used for one or more secondary purposes, for example, to supplement the thermally-curable coating material 18 in imparting the desirable property(ies) to the glass container 12, and/or to complement the thermally-curable coating material 18 by imparting some additional desirable property(ies) to the glass container 12. More particularly, the nanoparticles 20 may impart one or more of the following properties to the container 12: strength, color, ultraviolet protection, and/or antimicrobial properties.

Any suitable combination of properties of the thermally-curable coating material 18 and the nanoparticles 20 may be used. For example, FIG. 3 illustrates various combinations of thermally-curable coating material properties and nanoparticle properties for the container 12. Below, a few of these example combinations are discussed in further detail.

In one embodiment, the container 12 may include a thermally-curable coating material for strengthening the container 12, and nanoparticles 20 may be used to supplement and/or complement the thermally-curable coating material 18 in one or more ways. In a first example of this embodiment, the nanoparticles 20 may be used to supplement the strengthening properties of the thermally-curable coating material 18 to further strengthen the container 12. In a second example, the nanoparticles 20 impart color properties to the container 12. For instance, transition elements may be used for their susceptor properties as well as to impart size-dependent color (absorption) to the container 12. It is believed that color of the coating can be tuned by controlling the size and size distribution of the nanoparticles and by the concentration of the nanoparticles in the cured coating. An example range of nanoparticle size in this regard is about 1 to 250 nanometers. Copper and/or gold nanoparticles are specific examples of transition elements that may be used to impart color. In another instance of the second example, aluminum and/or silver nanoparticles may be used for their susceptor properties as well as for their relative colorlessness to result in a relatively colorless coating on the glass container 12. As used herein, the terminology color properties may include achromatic colors like white, gray, and black, colorlessness, or colors like red and blue for example. In a third example, the nanoparticles 20 impart ultraviolet protection to the container 12. For instance, zinc oxide nanoparticles (doped or undoped) may be used to impart ultraviolet light protection to the container 12. Those of ordinary skill in the art will recognize that ultraviolet protection properties may include UV blocking or UV filtering of a desired percentage of UV light. In a fourth example, the nanoparticles 20 impart antimicrobial properties to the container 12. For instance, silver nanoparticles may be used to impart antimicrobial properties to the container 12.

In another embodiment, the container 12 may include a thermally-curable coating material 18 for coloring the container 12, and nanoparticles 20 to supplement or complement the thermally-curable coating material 18. In a first example of this embodiment, the nanoparticles 20 strengthen the container 12. In a second example, the nanoparticles 20 supplement the thermally-curable coating material 18 by further imparting color to the container 12. In a third example, the nanoparticles 20 impart ultraviolet protection to the container 12. In a fourth example, the nanoparticles 20 impart antimicrobial properties to the container 12.

In a further embodiment, the container 12 may include a thermally-curable coating material 18 for imparting UV protection to the container 12, and nanoparticles 20 that supplement or complement the thermally-curable coating material 18. In a first example of this embodiment, the nanoparticles 20 strengthen the container 12. In a second example, the nanoparticles 20 impart color to the container 12. In a third example, the nanoparticles 20 supplement the UV protection properties of the thermally-curable coating material 18 to further impart ultraviolet protection to the container 12. In a fourth example, the nanoparticles 20 impart antimicrobial properties to the container 12.

Contrary to conventional wisdom, it is now believed that the small size of the nanoparticles 20 may be particularly advantageous for rapid and thorough heating of the thermally-curable coating material 18 to result in a good coating. Conventionally, it was believed that particle size on the order of 150 micrometers was optimal for use in conjunction with curing of coatings at microwave power and frequency settings. It is presently believed that because nanoparticles have a particularly high surface area to volume ratio, use of nanoparticles will enable curing of a coating using less than microwave power and frequency, at relatively lower curing temperatures, and/or for shorter curing times than ever before possible. For example, it is presently believed that the presently disclosed method may result in decreasing curing times to seconds or fractions of a second, thereby permitting coating of containers in an on-line manner at existing container manufacturing line speeds.

There thus has been disclosed a method of curing coatings on glass containers that fully satisfies all of the objects and aims previously set forth. The disclosure has been presented in conjunction with several exemplary embodiments, and additional modifications and variations have been discussed. Other modifications and variations readily will suggest themselves to persons of ordinary skill in the art in view of the foregoing discussion. The disclosure is intended to embrace all such modifications and variations as fall within the spirit and broad scope of the appended claims.

The invention claimed is:

1. A method for thermally curing a coating on a glass container, which includes the steps of:
   (a) coating an exterior surface of a glass container with a thermally-curable coating material consisting essentially of a polymeric material and 0.5-10 wt. % electrically conductive nanoparticles, said nanoparticles ranging in size from 1-100 nanometers along their largest dimension; and then
   (b) exposing said coated glass container to radio frequency radiation having a frequency in the range of 30 kilohertz to 30 megahertz such that absorption of said radio frequency radiation by said nanoparticles internally heats and cures said thermally-curable coating material to form a cured coating on said exterior surface of said glass container that does not reduce the transparency of said glass container by greater than 15%,
   wherein said cured coating is formed in said step (b) by exposing said coated glass container of said step (a) to said radio frequency radiation for less than 2.4 seconds.

2. The method set forth in claim 1 wherein said cured coating is formed in said step (b) by exposing said coated glass container of said step (a) to said radio frequency radiation for less than one second.

3. The method set forth in claim 1 wherein said electrically conductive nanoparticles are non-ferrous and include a transition metal element, a post-transition metal element, an electrically conductive metal oxide, or a combination thereof.

4. The method set forth in claim 1 wherein said electrically conductive nanoparticles include one or more materials selected from the group consisting of copper, gold, silver, platinum, and aluminum.

5. The method set forth in claim 1 wherein said electrically conductive nanoparticles are susceptors, and are formulated to absorb said radio frequency radiation of said step (b) and to internally transfer heat to said thermally-curable coating material during said step (b).

6. The method set forth in claim 1 wherein said electrically conductive nanoparticles do not include an ionic compound and also do not include a polar compound.

7. The method set forth in claim 1 wherein said electrically conductive nanoparticles supplement or complement said thermally-curable coating material by imparting strength, color, ultraviolet protection, antimicrobial properties, or a combination thereof to the glass container.

8. The method set forth in claim 1 wherein said polymeric material is selected from the group consisting of silane, siloxane, silicone, urethane, acrylate, and epoxy.

9. The method set forth in claim 8 wherein said step (a) includes applying a mixture of said polymeric material and said electrically conductive nanoparticles to said exterior surface of said glass container.

10. The method set forth in claim 8 wherein said step (a) includes separately applying said polymeric material and said electrically conductive nanoparticles to said exterior surface of said glass container.

11. A method for thermally curing a coating on a glass container, which includes the steps of:
   (a) coating an exterior surface of a glass container with a thermally-curable coating material consisting essentially of a polymeric material and 0.5-10 wt. % electrically conductive nanoparticles; and then
   (b) exposing said coated glass container to radio frequency radiation such that absorption of said radio frequency radiation by said nanoparticles internally heats and cures said thermally-curable coating material to form a cured coating on said exterior surface of said glass container.

12. The method set forth in claim 11 wherein said cured coating does not reduce the transparency of said glass container to visible light by greater than 15%.

13. The method set forth in claim 11 wherein said radiation has a frequency in the range of 30 kilohertz to 30 megahertz.

14. The method set forth in claim 11 wherein said nanoparticles range in size from 1-100 nanometers along their largest dimension.

15. The method set forth in claim 13 wherein said cured coating is formed in said step (b) by exposing said coated glass container of said step (a) to said radio frequency radiation for less than 2.4 seconds.

16. The method set forth in claim 14 wherein said cured coating does not reduce the transparency of said glass container by greater than 15%.

17. The method set forth in claim 16 wherein said cured coating is formed in said step (b) by exposing said coated glass container of said step (a) to said radio frequency radiation for less than 2.4 seconds, and said radiation has a frequency in the range of 30 kilohertz to 30 megahertz.

18. The method set forth in claim 1 wherein said cured coating does not reduce the transparency of said glass container to visible light by greater than 15%.

19. The method set forth in claim 1 wherein said electrically conductive nanoparticles include one or more materials selected from the group consisting of zinc oxide, zinc stannate, fluorine doped zinc oxide, aluminum doped zinc oxide, gallium doped zinc oxide, indium doped zinc oxide, tin dioxide, indium tin oxide, fluorine doped tin dioxide, antimony doped tin dioxide, phosphorus doped tin dioxide, and boron doped tin dioxide.

20. The method set forth in claim 11 wherein said polymeric material is selected from the group consisting of silane, siloxane, silicone, urethane, acrylate, and epoxy.

21. The method set forth in claim 11 wherein said electrically conductive nanoparticles are non-ferrous and include a transition metal element, a post-transition metal element, an electrically conductive metal oxide, or a combination thereof.

22. The method set forth in claim 11 wherein said electrically conductive nanoparticles include one or more materials selected from the group consisting of copper, gold, silver, platinum, and aluminum.

23. The method set forth in claim 11 wherein said electrically conductive nanoparticles include one or more materials selected from the group consisting of zinc oxide, zinc stannate, fluorine doped zinc oxide, aluminum doped zinc oxide, gallium doped zinc oxide, indium doped zinc oxide, tin dioxide, indium tin oxide, fluorine doped tin dioxide, antimony doped tin dioxide, phosphorus doped tin dioxide, and boron doped tin dioxide.

24. A method for thermally curing a coating on a glass container, which includes the steps of:
   (a) coating an exterior surface of a glass container with a thermally-curable coating material consisting essentially of a polymeric material and 0.5-10 wt. % electrically conductive nanoparticles, wherein said polymeric material is selected from the group consisting of silane, siloxane, silicone, urethane, acrylate, and epoxy, and wherein said nanoparticles range in size from 1-100 nanometers along their largest dimension; and then
   (b) exposing said coated glass container to radio frequency radiation having a frequency in the range of 30 kilohertz to 30 megahertz such that absorption of said radio frequency radiation by said nanoparticles internally heats and cures said thermally-curable coating material to form a cured coating on said exterior surface of said glass container that does not reduce the transparency of said glass container by greater than 15%,
   wherein said cured coating is formed in said step (b) by exposing said coated glass container of said step (a) to said radio frequency radiation for less than 2.4 seconds.

25. The method set forth in claim 24 wherein said electrically conductive nanoparticles are non-ferrous and include a transition metal element, a post-transition metal element, an electrically conductive metal oxide, or a combination thereof.

26. The method set forth in claim 24 wherein said electrically conductive nanoparticles include one or more materials selected from the group consisting of copper, gold, silver, platinum, and aluminum.

27. The method set forth in claim 24 wherein said electrically conductive nanoparticles include one or more materials selected from the group consisting of zinc oxide, zinc stannate, fluorine doped zinc oxide, aluminum doped zinc oxide, gallium doped zinc oxide, indium doped zinc oxide, tin dioxide, indium tin oxide, fluorine doped tin dioxide, antimony doped tin dioxide, phosphorus doped tin dioxide, and boron doped tin dioxide.

28. The method set forth in claim 24 wherein said electrically conductive nanoparticles supplement or complement said thermally-curable coating material by imparting strength, color, ultraviolet protection, antimicrobial properties, or a combination thereof to the glass container.

* * * * *